US011449889B2

United States Patent
Collart

(10) Patent No.: US 11,449,889 B2
(45) Date of Patent: *Sep. 20, 2022

(54) SYSTEM AND METHOD FOR CONDUCTING TRANSACTIONS WITH A MOBILE DEVICE

(71) Applicant: TracFone Wireless, Inc., Miami, FL (US)

(72) Inventor: Daniel Collart, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/165,072

(22) Filed: Feb. 2, 2021

(65) Prior Publication Data

US 2021/0158385 A1     May 27, 2021

Related U.S. Application Data

(63) Continuation of application No. 14/218,271, filed on Mar. 18, 2014, now Pat. No. 10,909,565.

(60) Provisional application No. 61/786,807, filed on Mar. 15, 2013.

(51) Int. Cl.
| | |
|---|---|
| *G06Q 30/02* | (2012.01) |
| *G06Q 20/22* | (2012.01) |
| *G06Q 20/36* | (2012.01) |
| *G06Q 20/32* | (2012.01) |

(52) U.S. Cl.
CPC ....... *G06Q 30/0226* (2013.01); *G06Q 20/227* (2013.01); *G06Q 20/3224* (2013.01); *G06Q 20/3276* (2013.01); *G06Q 20/36* (2013.01)

(58) Field of Classification Search
CPC ............ G06Q 30/0226; G06Q 20/227; G06Q 20/3224; G06Q 20/3276; G06Q 20/36
See application file for complete search history.

(56) References Cited

U.S. PATENT DOCUMENTS

| | | | |
|---|---|---|---|
| 2006/0265281 | A1 | 11/2006 | Sprovieri et al. |
| 2010/0151901 | A1 | 6/2010 | Roden et al. |

(Continued)

OTHER PUBLICATIONS

The Digital Wallet: Opportunities and Prototypes Rajesh Krishna Balan and Narayan Ramasubbu Singapore Management University (Year: 2009).*

*Primary Examiner* — Alexandru Cirnu

(57) ABSTRACT

A mobile wallet system includes an account module comprising a physical memory database to store account information associated with a plurality of transaction devices issued to a consumer, a location module comprising a location device to determine location information of the consumer, a reward program module comprising a physical memory database to store reward information of a plurality of reward programs associated with the plurality of transaction devices, a payment method module executed on a computer processor to determine a transaction device of the plurality of transaction devices that maximizes a reward for the consumer based at least in part on the account information, the location information and the reward information, and a processing module executed on a computer processor to use the determined transaction device to complete a transaction to purchase products or services in order to maximize rewards for the consumer.

19 Claims, 6 Drawing Sheets

(56) References Cited

U.S. PATENT DOCUMENTS

| | | | |
|---|---|---|---|
| 2012/0173305 A1* | 7/2012 | Bhaskaran | G06Q 30/0203 705/7.32 |
| 2012/0221420 A1* | 8/2012 | Ross | G06Q 40/00 705/16 |
| 2013/0197992 A1* | 8/2013 | Bao | G06Q 30/0244 705/14.43 |
| 2013/0268405 A1 | 10/2013 | Yeh | |

\* cited by examiner

Mobile User Device 102

Your

XYZ MART

ADDRESS OF XYZ MART

GASOLINE PURCHASE OF:

$45.92

MAY BE COMPLETED BY:

ABC CARD [OK]

DEF CARD [OK]

TO MAXIMIZE YOUR REWARDS!

[CANCEL]

Figure 5

SYSTEM AND METHOD FOR CONDUCTING TRANSACTIONS WITH A MOBILE DEVICE

CROSS-REFERENCE TO RELATED APPLICATIONS

This application is a continuation of U.S. application Ser. No. 14/218,271 filed Mar. 18, 2014, now U.S. Pat. No. 10,909,565, issued Feb. 2, 2021, which is hereby incorporated by reference in its entirety for all purposes as if fully set forth herein; and which application claims the benefit from U.S. Provisional Application No. 61/786,807 filed on Mar. 15, 2013, which is hereby incorporated by reference in its entirety for all purposes as if fully set forth herein.

FIELD OF THE DISCLOSURE

The present disclosure is related generally to a mobile transaction system and, more particularly, to a mobile transaction system and method for conducting commercial transactions using a mobile device.

BACKGROUND OF THE DISCLOSURE

An increasingly large number of transaction devices have become available to consumers engaged in purchase transactions. A transaction device may be used to effectuate payment in a transaction. Various transaction device issuers, such as credit card companies, banks, retailers and vendors may frequently provide consumers with various transaction devices. For example, consumers may have a variety of transaction devices, for example, credit cards, debit cards, pre-paid cards, gift cards, membership cards, reloadable cards, stored-value cards, smart cards and/or any other transaction devices that may be used to complete a transaction to purchase products or services. Also, different transaction devices may offer different rewards or incentives when used to complete a transaction to purchase products or services. For example, different rewards or incentives provided by each transaction device may include cash back, redeemable reward points, favorable interest rate, reward programs, loyalty programs, coupons, discounts and/or other rewards or incentives offered by issuers of the transaction devices.

Oftentimes, the issuers of the transactions devices may offer different rewards or incentives at various locations and time periods for the usage of the transaction devices. Also, the issuers of the transaction devices may offer different rewards or incentives at various retailers or types of products or services purchased using the transaction devices. Thus, it may be difficult for the consumer to track and monitor different rewards or incentives received by using different transaction cards at different locations and time periods. Also, due to the lack of knowledge of various rewards or incentives offered by different transaction devices, consumers may not maximize the rewards or incentives received. Thus, a system and method for conducting transactions that maximize the rewards or incentives for the consumer is needed.

SUMMARY OF THE DISCLOSURE

The foregoing needs are met, to a great extent, by the present disclosure, with a process and system for determining a transaction method that maximizes rewards or incentives for the consumer.

In one aspect a mobile wallet system includes an account module comprising a physical memory database to store account information associated with a plurality of transaction devices issued to a consumer, a location module comprising a location device to determine location information of the consumer, a reward program module comprising a physical memory database to store reward information of a plurality of reward programs associated with the plurality of transaction devices, a payment method module executed on a computer processor to determine a transaction device of the plurality of transaction devices that maximizes a reward for the consumer based at least in part on the account information, the location information and the reward information, and a processing module executed on a computer processor to use the determined transaction device to complete a transaction to purchase products or services in order to maximize rewards for the consumer.

There has thus been outlined, rather broadly, certain aspects of the present disclosure in order that the detailed description thereof herein may be better understood, and in order that the present contribution to the art may be better appreciated. There are, of course, additional aspects of the present disclosure that will be described below and which will form the subject matter of the claims appended hereto.

In this respect, before explaining at least one aspect of the present disclosure in detail, it is to be understood that the present disclosure is not limited in its application to the details of construction and to the arrangements of the components set forth in the following description or illustrated in the drawings. The present disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIG. 5 is an illustration of a graphical user interface displayed on a mobile user device in accordance with an embodiment of the present disclosure.

DETAILED DESCRIPTION OF EMBODIMENTS

A mobile wallet system may use aggregate account information to make and select a transaction device that maximizes rewards or incentives for the consumer. The aggregate account information may include reward or incentive information associated with various transaction devices. Also, the aggregate account information may include geographical location information of the consumer, retailer information, transaction information, other account information or the like. Thus, the mobile wallet system may use the aggregate account information to recommend a transaction device to purchase products or services in order to maximize rewards or incentives for the consumer. In an exemplary embodiment, the mobile wallet system may automatically select a transaction device that maximizes rewards or incentives for the consumer to complete transactions to purchase products or services. In another exemplary embodiment, the mobile wallet system may allow a consumer to select a transaction device that maximizes rewards or incentives for the consumer to complete transactions to purchase products or services.

The mobile wallet system may communicate with various systems hosted by various entities to complete the purchase of products or services. For example, the mobile wallet system may communicate with a mobile transaction server and a financial server via a communication network to complete the transaction to purchase products or services. Rewards or incentives for the usage of the transaction device may be provided to the consumer, upon completion of the transaction to purchase products or services. Also, the mobile wallet system may track and monitor rewards or incentives provided to the consumer. For example, a summary report (e.g., monthly or quarterly) of rewards or incentives provided to the consumer may be reported to the consumer.

Figure 1:
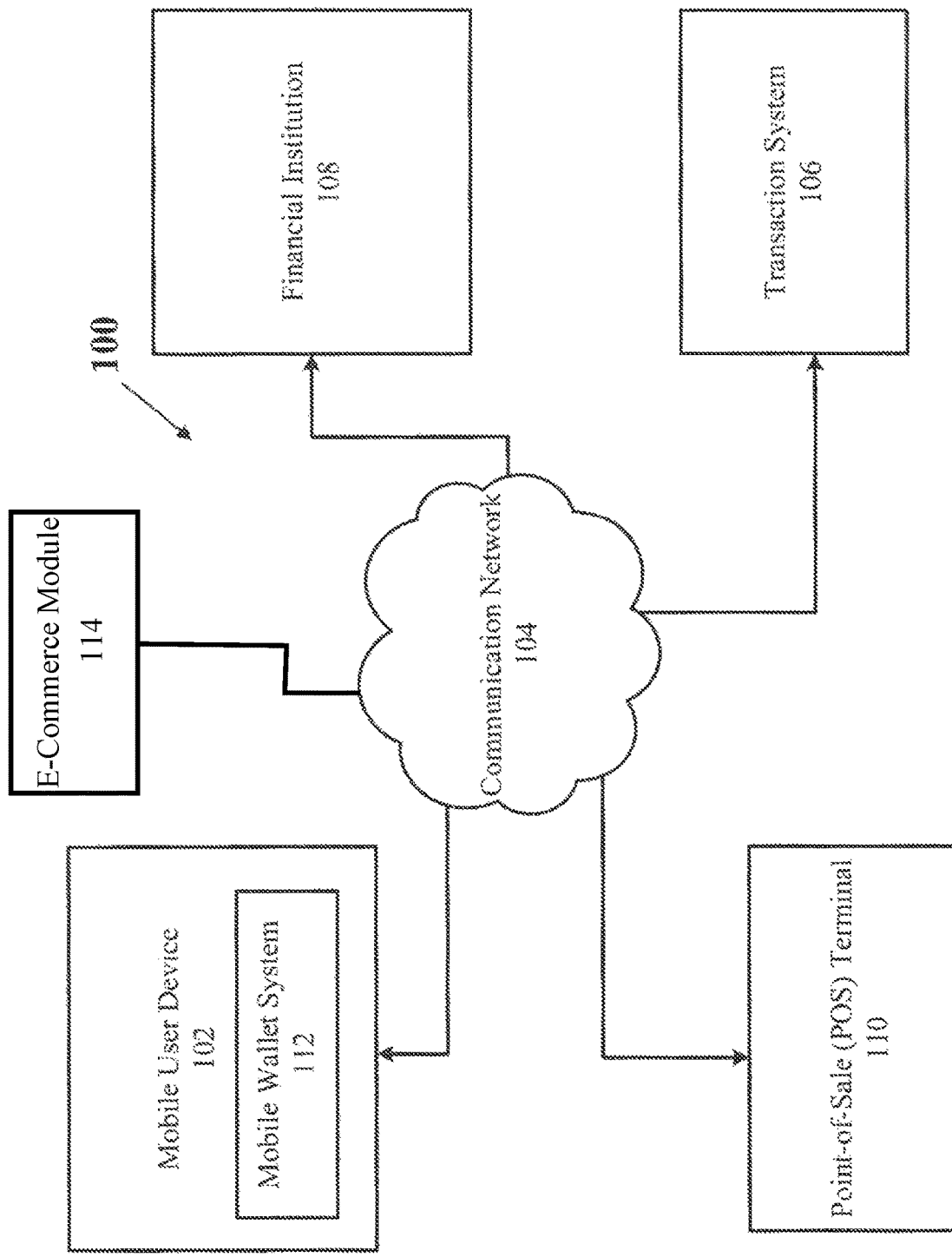
FIG. 1 shows a mobile transaction system in accordance with an embodiment of the present disclosure.

Referring to FIG. 1, there is shown a mobile transaction system 100 in accordance with an embodiment of the present disclosure. The mobile transaction system 100 may include a mobile user device 102 communicatively coupled to a transaction system 106, a financial institution 108, a point-of-sale (POS) terminal 110, an e-commerce system 114, and any other components necessary to complete a purchase. The mobile user device 102 may include a mobile wallet system 112 that may use aggregate account information to select a transaction device in order to maximize rewards or incentives for the consumer. For example, the mobile wallet system 112 may store one or more transaction devices (e.g., credit cards, debit cards, gift cards) issued to the consumer. The consumer may use the mobile user device 102 having the mobile wallet system 112 to purchase products or services at the POS terminal 110. The mobile wallet system 112 may select a transaction device (e.g., a credit card with 5% cash back or a credit card with mileage reward) to complete the transaction and purchase products or services based on the aggregate account information.

Although the mobile wallet system 112 is shown as residing on the mobile user device 102, the mobile wallet system 112 may also be alternatively located entirely or partially on a secondary system separate from the mobile user device 102. This secondary system may include a database, server, or the like that connects to the communication network 104 and provides the functionality described herein.

For example, the aggregate account information may include reward or incentive information of various transaction devices, geographical location information of the consumer, retailer information (e.g., POS information), transaction information and/or other account information. The mobile wallet system 112 may automatically select the transaction device that maximizes the reward or incentive for the consumer to complete the transaction and purchase products or services. In another example, the consumer may select a transaction device recommended by the mobile wallet system 112 to complete the transaction and purchase products or services. Additionally, the mobile wallet system 112 may provide a list of recommended transaction devices for the user to select in order to complete the transaction and purchase products or services.

The mobile user device 102 may include, for example but not limited to, a mobile phone, a smart phone, a computer, a personal computer, a laptop, a cellular communication device, a workstation, a mobile device, a phone, a television, a handheld PC, a personal digital assistant (PDA), a thin system, a fat system, a network appliance, an Internet accessible device, netbook, tablet computer, or other any other device that may be in communication with one or more of the transaction system 106, the financial institution 108, the POS terminal 110, and the e-commerce system 114 via the communication network 104. The mobile user device 102 may be coupled to the transaction system 106, the financial institution 108, the POS terminal 110, and the e-commerce system 114 via a wired link. In another exemplary embodiment, the mobile user device 102 may be coupled to the transaction system 106, the financial institution 108, POS terminal 110, and the e-commerce system 114 via a wireless link or a combination of a wired link and a wireless link.

The communication network 104 may couple the mobile user device 102 to the transaction system 106, the financial institution 108, the POS terminal 110, and the e-commerce system 114. The communication network 104 may be a wireless network, a wired network or any combination of wireless network and wired network. For example, the communication network 104 may include one or more of a fiber optic network, a passive optical network, a cable network, an Internet network, a satellite network (e.g., operating in Band C, Band Ku or Band Ka), a wireless LAN, a Global System for Mobile Communication (GSM), a Personal Communication Service (PCS), a long term evolution (LTE) network, a Personal Area Network (PAN), D-AMPS, Wi-Fi, Fixed Wireless Data, IEEE 802.11a, 802.11b, 802.15.1, 802.11n and 802.11g network or any other wired or wireless network for transmitting and receiving a data signal. In addition, the communication network 104 may include, without limitation, telephone line, fiber optics, IEEE Ethernet 802.3, wide area network (WAN), local area network (LAN), or global network aspects such as the Internet. The communication network 104 may support an Internet network, a wireless communication network, a cellular network, or the like, or any combination thereof.

The communication network 104 may further include one, or any number of the exemplary types of networks mentioned above operating as a stand-alone network or in cooperation with each other. Although the communication network 104 is depicted as one network, it should be appreciated that according to one or more embodiments, the communication network 104 may include a plurality of interconnected networks, such as, for example, a service provider network, the Internet, a broadcaster's network, a cable television network, corporate networks, home networks and the like.

The transaction system 106 may include one or more servers. For example, the transaction system 106 may include a UNIX based server, Windows 2000 Server, Microsoft IIS server, Apache HTTP server, API server, Java server, Java Servlet API server, ASP server, PHP server, HTTP server, Mac OS X server, Oracle server, IP server, other independent server or the like to support operations of a client. Also, the transaction system 106 may include one or more of an Internet Protocol (IP) network server or public switch telephone network (PSTN) server. The transaction system 106 may include one or more databases for storing a network model topology and network policies based at least in part on the network model topology.

The financial institution 108 may include one or more servers to communicate financial information to the mobile user device 102 and the POS terminal 110 via the communication network 104. For example, the financial institution 108 may include a UNIX based server, Windows 2000 Server, Microsoft IIS server, Apache HTTP server, API server, Java server, Java Servlet API server, ASP server, PHP server, HTTP server, Mac OS X server, Oracle server, IP server, other independent server or the like to provide financial information to the mobile user device 102 and the POS terminal 110. Also, the financial institution 108 may include one or more of an Internet Protocol (IP) network server or public switch telephone network (PSTN) server.

The financial institution 108 may include one or more memory storage devices including, without limitation, paper card storage, punched card, tape storage, paper tape, magnetic tape, disk storage, gramophone record, floppy disk, hard disk, ZIP disk, holographic, molecular memory or the like. The one or more storage devices may also include, without limitation, optical disc, CD-ROM, CD-R, CD-RW, DVD, DVD-R, DVD-RW, DVD+R, DVD+RW, DVD-RAM, Blu-ray, Minidisc, HVD, Phase-change Dual storage device and the like. The one or more storage devices may further include, without limitation, magnetic bubble memory, magnetic drum, core memory, core rope memory, thin film memory, twistor memory, flash memory, memory card, semiconductor memory, solid state semiconductor memory or any other like mobile storage devices.

The POS terminal 110 may include a scanner, a reader, a cash register, transceiver devices, and/or other detection devices that may identify products or services. For example, the scanners or the readers at the POS terminal 110 may include a near field communications (NFC) device, barcode reader, radio-frequency identification (RFID) detector, infrared detector, Bluetooth detector, laser scanner, cameras, image scanner, and/or other detection devices that may identify products or services. The POS terminal 110 may also include a mobile user device, a computer, a personal computer, a laptop, a cellular communication device, a workstation, a mobile device, a personal digital assistant (PDA), a thin system, a fat system, a network appliance, an Internet accessible device, netbook, tablet computer, or any other device that may be in communication with the mobile user device 102, the transaction system 106, the financial institution 108, and the e-commerce system 114. The POS terminal 108 may further include one or more intermediary devices that may communicate with the communication network 104, such as a transmitter/receiver, router, modem, a transceiver or the like. The POS terminal 110 may be coupled to the mobile user device 102, the transaction system 106, the financial institution 108, and the e-commerce system 114 via a wired link. In another example, the POS terminal 110 may be coupled to the mobile user device 102, the transaction system 106, the financial institution 108, and the e-commerce system 114 via a wireless link or a combination of a wired link and a wireless link.

The e-commerce system 114 may include one or more servers to communicate product or service information to the mobile user device 102 via the communication network 104. For example, the e-commerce system 114 may include a UNIX based server, Windows 2000 Server, Microsoft IIS server, Apache HTTP server, API server, Java server, Java Servlet API server, ASP server, PHP server, HTTP server, Mac OS X server, Oracle server, IP server, other independent server or the like to provide discount, coupon, and price information to the mobile user device 102. Also, the e-commerce system 114 may include one or more of an IP network server or PSTN server.

The e-commerce system 114 may include one or more memory storage devices including, without limitation, paper card storage, punched card, tape storage, paper tape, magnetic tape, disk storage, gramophone record, floppy disk, hard disk, ZIP disk, holographic, molecular memory or the like. The one or more storage devices may also include, without limitation, optical disc, CD-ROM, CD-R, CD-RW, DVD, DVD-R, DVD-RW, DVD+R, DVD+RW, DVD-RAM, Blu-ray, Minidisc, HVD, Phase-change Dual storage device and the like. The one or more storage devices may further include, without limitation, magnetic bubble memory, magnetic drum, core memory, core rope memory, thin film memory, twistor memory, flash memory, memory card, semiconductor memory, solid state semiconductor memory or any other like mobile storage devices.

The e-commerce system 114 may include online retailers and the mobile phone service provider's network. The mobile user device 102 may search the online retailers' web sites and the mobile phone service provider's network via communication network 104. The mobile user device 102 may search the e-commerce system 114 or the mobile phone service provider's network to identify a product or service the user of the mobile user device 102 is interested in purchasing. The mobile user device 102 may search the e-commerce system 114 or the mobile phone service provider's network using the product or service's barcode, QR code, picture, or any other identifying features. The mobile user device 102 may also search the e-commerce system 114 or the mobile phone service provider's network to find the best coupons, discounts, or retail prices of a product or service. The e-commerce system 114 or the mobile phone service provider's network may transmit the identified product or service or best coupons, discounts, and retail prices to the mobile user device 102.

Figure 2:
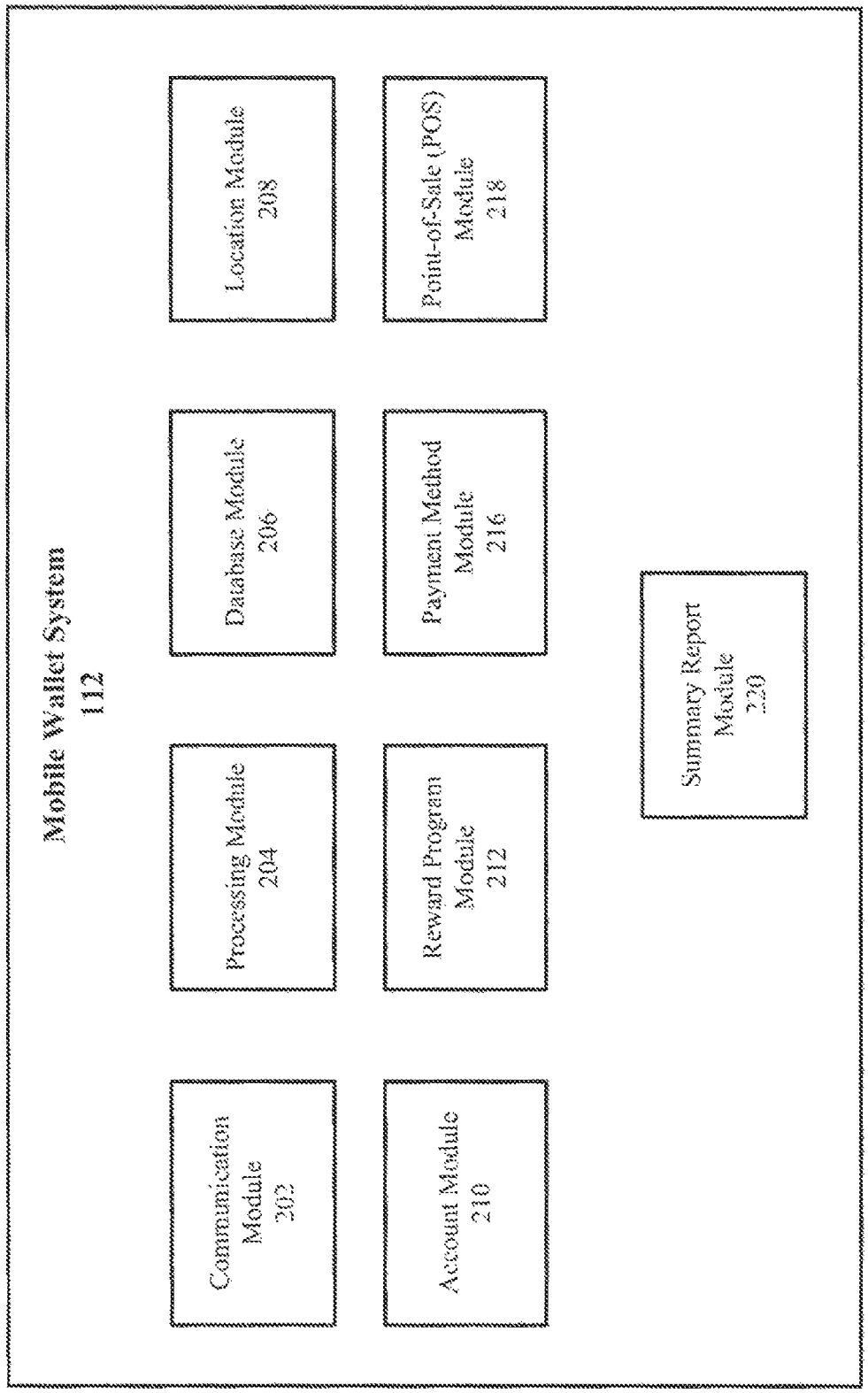
FIG. 2 shows a block diagram of hardware components of a mobile wallet system of a mobile transaction system in accordance with an embodiment of the present disclosure.

FIG. 2 is a block diagram of hardware components of the mobile wallet system 112 of the mobile transaction system 100 in accordance with an embodiment of the present disclosure. The mobile wallet system 112 may include a communication module 202, a processing module 204, a database module 206, a location module 208, an account module 210, a reward program module 212, a payment method module 216, a POS module 218 and a summary report module 220. It is noted that modules 202-220 are exemplary and the functions performed by one or more of the modules may be combined with that performed by other modules. The functions described herein as being performed by modules 202-220 also may be separated and may be located or performed by other modules.

The communication module 202 may include transceivers and a computer processor to establish a communication path with one or more of the transaction system 106, the financial institution 108, the POS terminal 110, and the e-commerce system 114 via the communication network 104. For example, the communication module 202 may include a user interface (e.g., a graphical user interface (GUI), an application programming interface (API)) or the like to transmit information between the mobile wallet system 112 and one or more of the transaction system 106, the financial institution 108, the POS terminal 110, or the e-commerce system 114. For example, the communication module 202 may include a separate or unified graphical user interface to communicate with the consumer. In another example, the communication module 202 may include an API or the like to communicate with one or more of the transaction system 106, the financial institution 108, POS terminal 110, and the e-commerce system 114. Additionally, communication module 202 may search the Internet, the phone service provider, or the database module 206 to identify a product or service the user is interested in purchasing. The communication module 202 bases its search on the information about the product or service it retrieves or is provided by the POS module 218. The mechanism by which the POS module 218 receives this data is described in detail below in regard to the description of the POS module 218. Once the product or service has been identified on the e-commerce module 114, the mobile phone service provider's network, or database module 206, that information may be communicated to the communication module 202. Also, after identifying the product or service, the communication module 202 may then perform another search on the Internet, the mobile phone service provider's network, or the database module 206 to identify the best coupons, discounts, and retail prices available. The communication module 202 may be communicatively coupled to other modules of the mobile wallet system 112. For example, the communication module 202 may receive information from the consumer, the transaction system 106, the financial institution 108, the POS terminal 110, and the e-commerce system 114 and provide the information to other modules of the mobile wallet system 112. In an exemplary embodiment, the communication module 202 may provide the received information to the processing module 204 for processing or the database module 206 for storing. In another embodiment, the communication module 202 may communicate to, for example, processing module 204 or payment method module 216, the product or service identification information or retail price, discounts, or coupons.

The location module 208 may include at least one global positioning system (GPS) device, a geomagnetic sensor, a local positioning system (LPS), a triangulation system, a trilateration system, a multilateration system, an indoor positioning system, a hybrid positioning system, a real-time locating system, a dynamic positioning system and/or other positioning system that may determine a location of the mobile user device 102 and the consumer. The positioning information may include an address, a zone, a town, a village, a city, a state, a province, a region, a country, a continent, longitudinal and latitudinal coordinates or the like that may identify a location of the mobile user device 102.

The location module 208 may provide the positioning information to other modules (e.g., the communication module 202, the processing module 204, the database module 206, the account module 210, a reward program module 212, a payment method module 216, a POS module 218 and a summary report module 220) of the mobile wallet system 112 for processing. Also, the location module 208 may provide the positioning information to the transaction system 106 and the financial institution 108 to complete a transaction to purchase products or services.

The account module 210 may store various account information of transaction devices of the consumer. The account module 210 may include or use a computer processor and a physical memory database to store the various account information of transaction devices of the consumer. For example, the account module 210 may store account information of transaction devices that may include a credit card, debit card, pre-paid cards, a gift card, membership cards, a stored-value card, a smart card, a refund card, a government card, a coupon, a reward, a voucher, an electronic mail, a scan code, and/or other transaction devices that may be used to complete a transaction to purchase products or services. The account information may include one or more of identification number, expiration date, security number, name, address, phone number, electronic mail address, website address, income, spending habits, age and/or other information of a consumer.

The account information stored in the account module 210 may be updated periodically. For example, the account information may be updated daily, weekly, monthly, quarterly, seasonally, yearly and/or other predetermined period of time. The account module 210 may communicate with the transaction system 106 and/or the financial institution 108 directly or via the communication module 202. The transaction system 106 and/or the financial institution 108 may provide updated account information of various accounts of transaction devices of the consumer to the account module 210.

The POS terminal 110 may establish communication with the POS module 218 and/or the communication module 202 of the mobile wallet system 112. The POS terminal 110 may provide the transaction information to the POS module 218 and/or the communication module 202. The POS module 218 may provide the transaction information to other modules of the mobile wallet system 112. The POS module 218 may include or use a computer processor or a database to process and store the transaction information. For example, the POS module 218 may identify products or services purchased at the POS terminal. The POS module 218 may also identify a time or a date of purchase at the POS terminal. The POS module 218 may further identify the transaction device determined by the payment method module 216 used to purchase the products or services. The POS module 218 may store the transaction information for a predetermined and/or programmable period of time. For example, the POS module 218 may store the transaction information for a duration specified by the consumer. Additionally, the POS module 218 may include a detection device that may scan a barcode or QR code associated with the product or service or take a picture of the product. The POS module 218 may scan a barcode or QR code or a picture of the product or service by using photographic capabilities of the mobile user device 102. The mobile user device 102 may have specialized software to interpret the barcode or QR code.

The reward program module 212 may include or use a computer processor and a database to store reward or incentive information of reward or incentive programs created by the transaction system 106 and/or the financial institution 108. For example, the financial institution 108 may create various reward or incentive programs for the transaction devices in order to induce consumers to use the transaction device to purchase products or services. In an exemplary embodiment, the financial institution 108 may create a restaurant reward program that may provide 5% cash back when the consumer uses the credit card issued by the financial institution 108 to complete a transaction at a restaurant. In another exemplary embodiment, the financial institution 108 may create a travel reward program that may provide one reward mile for every dollar spent on travel using the debit card issued by the financial institution 108. In another exemplary embodiment, the financial institution 108 may create a grocery reward program that may provide rebates or coupons when the consumer uses the membership card issued by the financial institution 108 or other entities to complete a transaction at a grocery store. Also, the transaction system 106 may create reward or incentive programs similar to the reward or incentive programs created by the financial institution 108.

The reward or incentive information stored in the reward program module 212 may provide rules or conditions of the reward or incentive program created by the transaction system 106 and/or the financial institution 108. Different rules or conditions may be associated with different reward or incentive programs of the transaction devices issued by the transaction system 106 and/or the financial institution 108. For example, the rules or conditions may require a consumer to visit a website associated with the transaction system 106 and/or the financial institution 108 and sign up for the reward or incentive programs in order to qualify for the benefits associated with the reward or incentive programs. Also, the rules or conditions may limit a time period of the reward or incentive programs. For example, the rules or conditions may limit the reward or incentive programs to a period of three months. The rules or conditions may limit a location that the reward or incentive programs may apply. For example, the rules or conditions may limit the reward or incentive programs to a transaction that occurs within United States. Further, the rules or conditions may create categories of products and services for a reward or incentive program of a transaction device. For example, the rules or conditions may provide a 1% cash back on products or services purchased, 2% cash back on groceries, 3% cash back on gas and 5% cash back on travel.

The rules or conditions may include a reward limit for the reward or incentive programs. For example, the rules or conditions may include a one hundred dollar limit for the reward received per consumer of the program profiles. The rules or conditions may include a membership condition to receive rewards or incentives of membership reward programs. For example, the rules or conditions may require that the consumer is a member of the transaction system 106 and/or the financial institution 108. The rules or conditions may include a merchant condition reward program. For example, the rules or conditions of the merchant condition reward program may require the consumer to use the transaction device at a particular merchant (e.g., TracFone®) to receive rewards or incentives. The rules or conditions may include other rules or conditions of various reward or incentive programs provided by the transaction system 106 and/or the financial institution 108.

The rules or conditions may include discounts, rebates or rewards associated with the usage of various transaction devices. For example, the rules or conditions may include a ten percent discount for using the loyalty card to purchase products or services at the POS 110 of a loyalty merchant. In another example, the rules or conditions may include a five dollar rebate (e.g., gift card) for using the debit card at the POS 110 to complete a transaction of one hundred dollars or more. In other embodiments, the rules or conditions may include a reward for using the credit card to purchase products or services at the POS 110 for at least once a month. The rules or conditions may include discounts, rebates or rewards for a predetermined amount of usage of the transaction devices issued by the transaction system 106 and/or the financial institution 108. The predetermined amount of usage may include a frequency of usage (e.g., once a week) of the transaction device or a monetary amount of usage (e.g., $100) of the transaction device. Also, the predetermined amount of usage may include a minimum frequency of usage of the transaction device in order to avoid dormancy of the transaction device.

The payment method module 216 may include or use a computer processor and a database to determine which transaction device stored in the account module 210 maximizes the rewards or incentives for the consumer. The payment method module 216 may determine a transaction device that maximizes the rewards for the consumer based at least in part on reward programs of the various transaction devices, the location information provided by the location module 208, and information from the POS module 220. For example, the location module 208 may determine that the consumer may be located in a foreign country and the POS module 220 may determine that the consumer is purchasing food at a restaurant. The payment method module 216 may determine to use a credit card to complete the transaction because the credit card does not have foreign transaction fees and offers a reward for purchases made at a restaurant. In another example, the location module 208 may determine that the consumer is located at a department store and the POS module 220 may determine that the consumer is purchasing clothes. The payment method module 216 may determine to use a loyalty card of the department store to complete the transaction because the loyalty card offers the maximum amount of reward for the purchase. In other examples, the location module 208 may determine that the consumer has travelled to another state and the POS module 220 may determine that the consumer is purchasing gasoline at a gas station. The payment method module 216 may determine to use a credit card that offers 5% cash back for purchases made at a gas station in order to maximize the reward for the consumer.

Also, the payment method module 216 may determine a transaction device to complete a purchase of products or services based at least in part on credit limits or balance utilization of the transaction device. The payment method module 216 may determine use of a transaction device that has high credit limits and low balance in order to ensure the completion of a plurality of purchases of products or services. In another example, the payment method module 216 may determine use of a transaction device that has sufficient funds or credit limit in order to avoid payment rejection at the POS terminal.

The payment method module 216 may communicate with the transaction system 106, the financial institution 108 or the like in order to determine whether the consumer qualifies for a transaction device that maximizes the reward for the consumer. For example, the payment method module 216 may communicate with the transaction system 106 and/or the financial institution 108 and determine that the consumer qualifies for a credit card with a limit of $10,000 and no interest for one-year. The payment method module 216 may provide consumer information to the transaction system 106 and/or the financial institution 108 to apply for the credit card in order to complete the purchase of products or services. The credit card may allow the consumer to make monthly payments to pay off the balance of the credit card with no interest for one-year.

The payment method module 216 may determine transaction information for the purchase of products or services. The transaction information may include one or more of a date, price, description, size, universal price code (UPC), size, expiration date, merchant, location and other information to complete the purchase of products or services. The payment method module 216 may determine the transaction device that maximizes the rewards or incentives of the consumer based at least in part on the transaction information. For example, a transaction device may offer a double reward during a promotional period. The payment method module 216 may determine whether the date of the transaction falls within the promotional period. If the date of the transaction falls within the promotional period, the payment method module 216 may use the transaction device to complete the purchase of products or services in order to double the rewards for the consumer. In another exemplary embodiment, the transaction device may offer a discount or rebate for product or services that may expire soon. The payment method module 216 may determine an expiration date of the products or services to be purchased and may use the transaction device to complete the purchase of the products or services if the products or services are about to expire. Additionally, the payment method module 216 may identify any rewards available as a result of the transaction devices and apply those rewards to the best coupons, discounts, and prices found as a result of a search of the product or service on the Internet, the phone service provider's network, or the database module 206. The payment method module 216 may then apply any such rewards to the coupons, discounts, and prices found.

The payment method module 216 may determine whether a special reward may be associated with a transaction device. For example, the special reward may include any incentive that may induce the consumer to use the transaction device. For example, the special reward may include a twenty dollar reward for the first usage of the transaction device, one hundred dollar reward for first three uses of the transaction device, or 20% more reward points if consumer purchases two nights or more for a hotel stay. The payment method module 216 may determine whether the transaction qualifies as a special reward. If the payment method module 216 determines that the transaction qualifies as special reward, the payment method module 216 may determine using a particular transaction device to complete the purchase of products or services.

The payment method module 216 may determine a transaction device based at least in part on government or financial regulations. For example, the payment method module 216 may select a transaction device that may pay the lowest tax to complete the purchase of products or services. Also, the payment method module 216 may select a corporate transaction device to complete the purchase of products or services that may be eligible for tax deduction. Further, the payment method module 216 may select a transaction device that has a stored-value of pre-tax money to complete a purchase of products or services.

The payment method module 216 may determine a transaction device based at least in part on a shared or joint account. For example, the shared or joint account may be created with family members, an organization or other individuals that may share an account with the consumer. For example, the payment method module 216 may determine using a transaction device with a shared account with a family member to purchase books or pay tuition for the consumer. Also, the payment method module 216 may determine using a transaction device with shared account with an organization to purchase equipment or supplies for the organization.

The payment method module 216 may determine a transaction device based at least in part on user input. The user input may be a defined goal. For example, a user may input a goal to accumulate a predetermined amount of reward points, a goal of cash back, a goal of charity donation, a goal of taking a vacation, a goal of saving and/or any other goals defined by the user. The payment method module 216 may determine a transaction device in order to achieve the goal defined by the consumer. For example, the user may define a goal of cash back, the payment method module 216 may determine a particular transaction device to complete a purchase of products or services in order to achieve the goal of cash back. In another exemplary embodiment, the user may define a goal of saving, the payment method module 216 may determine a transaction device in order to achieve the goal of saving.

The payment method module 216 may determine a transaction device based at least in part on a forecast. For example, the forecast may be a cash flow forecast, a savings forecast, a cash balance forecast, income forecast, retirement forecast and/or other economic forecasts. The payment method module 216 may plan to use various transaction devices to complete the transaction based at least in part on an income forecast. Also, the payment method module 216 may determine a transaction device based at least in part on the cash flow forecast.

The payment method module 216 may provide a GUI to prompt the consumer for a selection of a transaction device. For example, the payment method module 216 may present a plurality of transaction devices to the consumer via a GUI. The consumer may select one of the plurality of transaction devices provided by the payment method module 216 to purchase products or services at the POS terminal 110. For example, the payment method module 216 may provide a credit card payment method that provides a 2% cash back, a debit card payment method that provides free-checking and ATM, and a loyalty card payment method that provides rewards points that may be redeemed to purchase products or services. The consumer may select one of the three transaction devices based on which reward that the consumer prefers. In another exemplary embodiment, the consumer may set the payment method module 216 to automatically select the transaction device that maximizes the rewards for the consumer. For example, the consumer may rank rewards provided by various transaction devices and the payment method module 216 may select the transaction device based on the ranking selected by the consumer. The consumer may rank rewards in the following order, for example, cash back, travel miles, reward points, coupons, discounts and charity donations. The payment method module 216 may select a transaction device that maximizes the cash back for the consumer.

The processing module 204 may access various modules to complete the purchase of products or services. The processing module 204 may include one or more computer processors and databases to access information from various modules of the mobile wallet system 112. For example, the processing module 204 may access information stored at the account module 210, the reward program module 212, the payment method module 216 and the POS module 218 to complete the purchase of products or services.

For example, the processing module 204 may access account module 210 to obtain account information associated with the transaction device determined by the payment method module 216 tendered for payment. The processing module 204 may access the reward program module 212 to determine a reward program associated with the transaction device tendered for payment. The processing module 204 may access the reward program module 212 to identify one or more rules or conditions based at least in part on the reward program. The processing module 204 may access the transaction information stored at the POS module 218. The processing module 204 may communicate with the transaction server 106 and/or the financial institution 108 in order to obtain authorization to use the selected transaction device. The processing module 204 may authorize a transaction when determined that the transaction device tendered for payment is authorized to purchase the products or services. The communication module 202 or the POS module 218 may provide an approval message to the POS terminal to approve the transaction. Also, the transaction server 106 and/or the financial institution 108 may provide the approval message to the POS terminal 110.

Additionally, after the payment method module 216 applies rewards available as a result of the transaction devices, the processing module 204 may select the best found results from the e-commerce system in terms of price, value, and convenience. Once the processing module 204 selects the best options in terms of price, value, and convenience, the processing module may display the results to a user of the mobile user device 102.

Once the processing module 204 approves a transaction, the processing module 204 may record the rewards or incentives for the consumer in a summary report module 220. The summary report module 220 may organize the rewards or incentives based at least in part on a reward program or an account for a predetermined and/or programmable period of time. For example, the summary report module 220 may organize the rewards or incentives for a fiscal year, a quarter, a month, a week or any other time period. The summary report module 220 may also organize the rewards or incentives for the duration of the reward program. For example, the summary report module 220 may organize rewards or incentives for a travel reward program or a restaurant reward program. The summary report module 220 may organize rewards or incentives based at least in part on an account of the transaction device.

Figure 3:
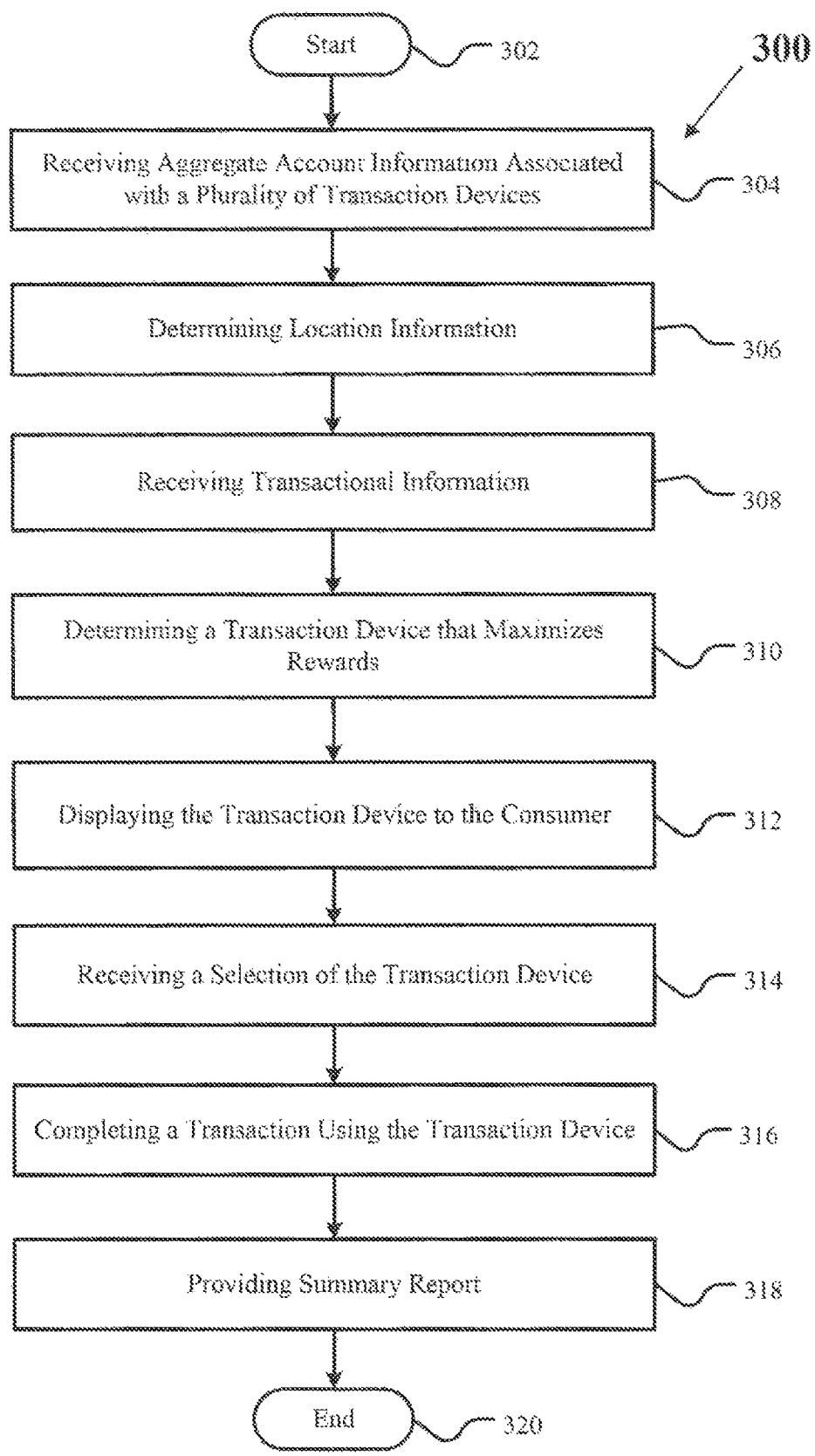
FIG. 3 is a flow chart illustrating the functionality of a mobile wallet system according to an embodiment of the present disclosure.

FIG. 3 is a flow chart illustrating the functionality of the mobile wallet system 112 according to an embodiment of the present disclosure. This exemplary method 300 may be provided by way of example, as there are a variety of ways to carry out the method. The method 300 shown in FIG. 3 can be executed or otherwise performed by one or a combination of various systems. The method 300 is described below may be carried out by the systems and networks shown in FIGS. 1 and 2, by way of example, and various elements of the systems and networks are referenced in explaining the example method of FIG. 3. Each block shown in FIG. 3 represents one or more processes, methods or subroutines carried out in exemplary method 300. Referring to FIG. 3, exemplary method 300 may begin at step 302.

At step 302, the method 300 for completing a transaction to purchase products or services using the mobile wallet system 112 may be started.

At step 304, aggregate account information associated with a plurality of transaction devices may be received. The transaction server 106 and the financial institution 108 may issue a plurality of transaction devices to a consumer that may be used to complete a transaction to purchase products or services. Each of the plurality of transaction devices may have associated aggregate account information. The transaction server 106 and the financial institution may provide aggregate account information associated with each of the plurality of transaction devices of the consumer to the account module 210. The plurality of transaction devices may include a credit card, debit card, pre-paid cards, a gift card, membership cards, a stored-value card, a smart card, a refund card, a government card, a coupon, a reward, a voucher, an electronic mail, a scan code, and/or other transaction devices that may be used to complete a transaction to purchase products or services. The aggregate account information may include one or more of an identification number, expiration date, security number, name, address, phone number, electronic mail address, website address, income, spending habits, age and/or other information of a consumer. After, receiving aggregate account information associated with a plurality of transaction devices from the transaction server 106 or the financial institution 108, the method 300 may move to step 306.

At step 306, geographical location information may be determined. The location module 208 may determine a geographical location of a consumer. For example, the location module 208 may determine whether the consumer is located in a foreign country. Also, the location module 208 may determine whether the consumer is located at a merchant or retailer. Further, the location module 208 may determine merchants or retailers located within a predetermined proximity (e.g., 5 miles radius) of the consumer. After determining geographical location information via the location module 208, the method 300 may move to step 308.

At step 308, transactional information may be received. For example, the POS terminal 110 may provide transactional information to the mobile wallet system 112 via the communication network 104. The products or services may be scanned or detected at the (POS) terminal 110. The POS terminal 110 may determine transactional information associated with the products or services and provide the transactional information to the mobile wallet system 112. Also, the POS module 220 may gather transactional information. For example, the POS module 218 may include a detection device that may scan a bar code associated with the products or services to be purchased. The POS module 218 may determine transactional information based at least in part on the scanned bar code. The transactional information may include one or more of a name, description, price, Universal Product Code (UPC), date, time, merchant/retailer, sales person, location and/or other information for completing the purchase of products or services. After receiving transactional information from the POS terminal 110, the method may move to step 310.

At step 310, a payment transaction device that maximizes rewards for the consumer may be determined based at least in part on the aggregate account information, the geographical location information and the transactional information. For example, the processing module 210 may receive transactional information and determine that the consumer may purchase food from a grocery store. The processing module 204 may determine a credit card that offers maximum amount of cash back (e.g., 5%) for purchasing food from the grocery store. In another example, the location module 208 may determine that the consumer is located in a foreign country and wants to purchase a ticket at a tourist site. The processing module 204 may determine using a debit card that does not have any foreign transaction/processing fees. In other examples, the consumer may want to make a purchase at a membership only warehouse. The processing module 204 may determine using a membership card of the warehouse in order to complete a purchase of products or services at the warehouse. After determining a transaction device that maximizes rewards for the consumer via the processing module 204, the method 300 may move to step 312.

At step 312, the transaction device that maximizes rewards for the consumer may be displayed to the consumer. The mobile user device 102 may display the transaction device that maximizes rewards for the consumer. Also, the transaction system 106 may display the transaction device that maximizes rewards for the consumer. Further, the financial institution 108 may display the transaction device that maximizes rewards for the consumer. The POS terminal 110 may display the transaction device that maximizes rewards for the consumer. After displaying the transaction device that maximizes rewards for the consumer, the method 300 may move to step 314.

At step 314, a selection of the transaction device may be received. The consumer may select the displayed transaction device that maximizes rewards to complete the purchase of products or services. In another exemplary embodiment, the user may set the mobile user device 102 to automatically select the transaction device that maximizes rewards to complete the purchase of products or services. After receiving a selection of transaction device to complete a transaction to purchase products or services, the method 300 may proceed to step 316.

At step 316, the transaction for purchasing products or services may be completed. For example, the mobile user device 102 may communicate information associated with the transaction device that maximizes reward for the consumer to the POS terminal 110. In another exemplary embodiment, the POS terminal 110 may access the transaction system 106 and/or the financial institution 108 to obtain information associated with the transaction device that maximizes reward for the consumer. The POS terminal 110 may use the information associated with the transaction device that maximizes a reward for the consumer to obtain authorization from the transaction system 106 or the financial institution 108 to complete the transaction to purchase products or services. After completing the transaction for purchasing products or services, the method 300 may proceed to step 318.

At step 318, a summary report of rewards or incentives received may be provided. The summary report module 220 may list rewards or incentives received by the consumer. For example, the summary report module 220 may provide a monthly report of rewards or incentives received by the consumer. After providing a summary report of rewards or incentives received by the consumer, the method 300 may proceed to step 320.

At step 320, the method 300 for completing a transaction to purchase products or services using the mobile wallet system 112 may end.

Figure 4:
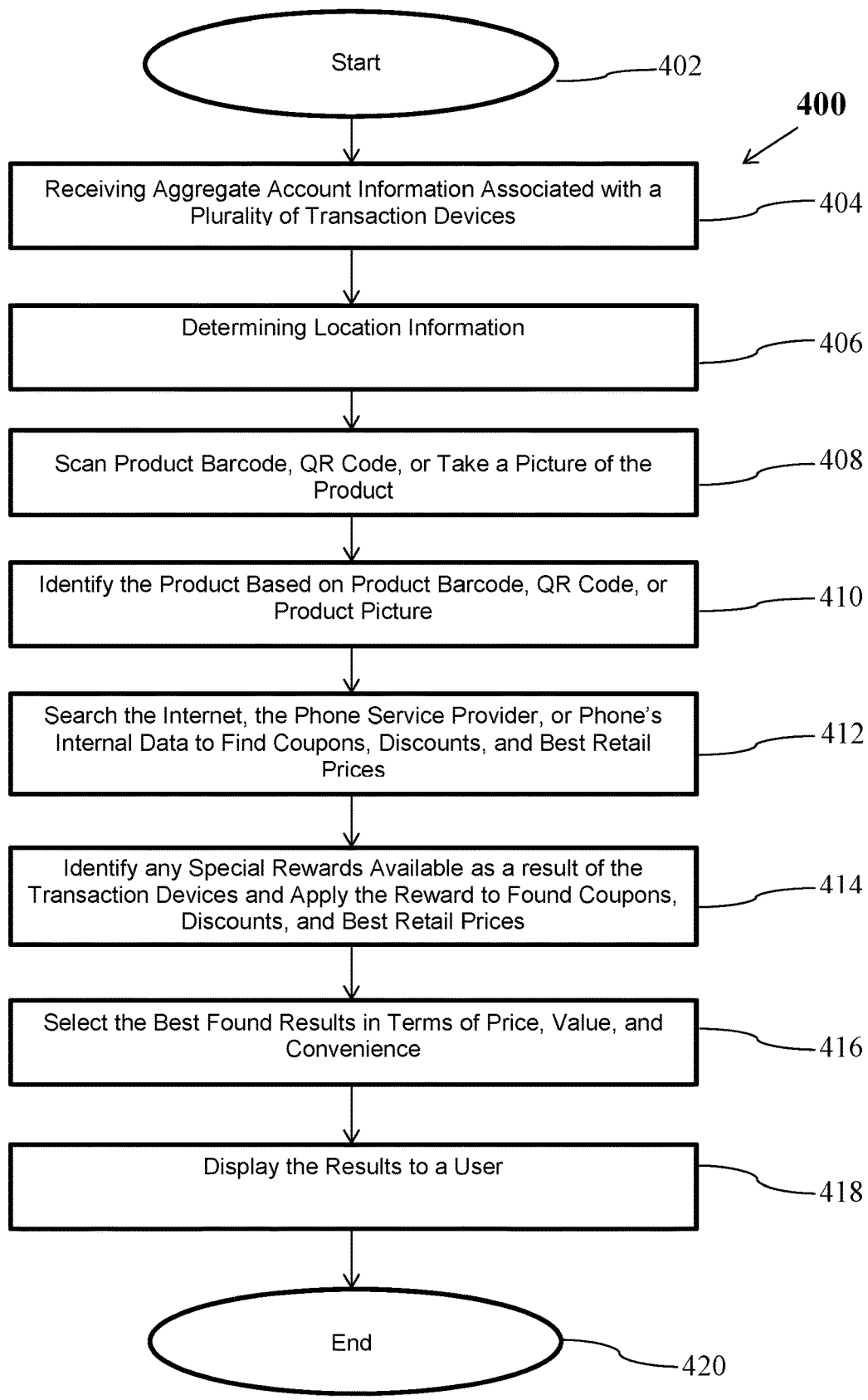
FIG. 4 is a flow chart illustrating the functionality of a mobile wallet system according to another embodiment of the present disclosure.

FIG. 4 is a flow chart illustrating the functionality of the mobile wallet system 112 according to another embodiment of the present disclosure. This exemplary method 400 may be provided by way of example, as there are a variety of ways to carry out the method. The method 400 shown in FIG. 4 can be executed or otherwise performed by one or a combination of various systems. The method 400 described below may be carried out by the systems and networks shown in FIGS. 1 and 2, by way of example, and various elements of the systems and networks are referenced in explaining the example method of FIG. 4. Each block shown in FIG. 4 represents one or more processes, methods or subroutines carried out in exemplary method 400. Referring to FIG. 4, exemplary method 400 may begin at step 402.

At step 402, the method 400 for finding and displaying a product or service the user is interested in purchasing by finding the product at different locations, such as the Internet, and showing the best options according to price, convenience, and value using the mobile wallet system 112 may be started.

At step 404, aggregate account information associated with a plurality of transaction devices may be received. The details of this step are similar to those described in step 304 in connection with method 300. After aggregating the account information associated with a plurality of transaction devices, the method 400 may proceed to step 406.

At step 406, geographical location information may be determined. The location module 208 may determine a geographical location of a consumer. The details of this step are similar to those described in step 306 in connection with method 300. After the geographical location information is determined, the method 400 may proceed to step 408.

At step 408, a user of the mobile device 102 may scan a product or service's barcode or QR code or take a picture of the product or service using the mobile user device's 102 camera. The user may use the photographic capabilities of the mobile user device 102 and specialized software installed on the mobile user device 102 to interpret the product or service's barcode or QR code. The specialized software may decode the information encoded within the barcode or QR code and store the decoded information in a storage device, such as, for example, database module 206. If the user takes a photograph of the product or service, then that photograph may be stored in a storage device, such as, for example, database module 206. Once the information has been stored in, for example, database module 206, the method 400 may proceed to step 410.

At step 410, the mobile user device 102 may send the barcode, QR code, or picture to a database. The database may be located on the mobile user device 102 or it may be located remotely. For example, the database may be accessed using the mobile phone service provider's network. The database then searches its records to identify the product or service. Additionally, the mobile user device 102 may use the barcode, QR code, or picture to conduct a search on one or more Internet retailers' websites to identify the product or service. The database may then identify the information related in the barcode, QR code, or picture with a product stored within the database. The identified product may then be sent to the communication module 202. The communication module 202 may then send the identified product to other modules located on the mobile user device 102. After the product has been identified, the method 400 may proceed to step 412.

At step 412, the mobile user device 102 may search the Internet, the mobile phone service provider's network, or the mobile user device's 102 database module 206 to find coupons, discounts, and retail prices for the identified product. The mobile user device 102 may use the communication module 202 to search one or more Internet retailers' websites to find the price, coupons, or discounts available at those retailers' websites. The websites searched may be predetermined or the user may select which websites, if any, to search. Additionally, or instead of searching websites, the mobile user device 102 may use the communication device 202 to search the mobile phone service provider's network to find any prices, coupons, or discounts provided to the mobile phone service provider's customers. Also, or instead of searching websites and the phone service provider's network, the mobile user device 102 may search the database module 206 for any prices, coupons, or discounts that had already been downloaded to the mobile user device 102. After coupons, discounts, and retail prices for the identified product have been found, the method 400 may continue to step 414.

At step 414, the mobile user device 102 identifies any rewards available as a result of the plurality of the transaction devices stored on the mobile user device 102. The payment method module 216 then applies any rewards to the found coupons, discounts, and retail prices identified in step 412 and calculates the final price of the products found as a result of the search in step 412. After identifying any rewards and applying those rewards to the found prices, discounts, and coupons in step 412, the method 400 may continue to step 416.

At step 416, the mobile user device 102 selects the best results in terms of price, value, and convenience. The mobile user device 102 may select the best result to purchase in terms of price by comparing the prices of the product from various retailers and selecting the one offering the product at the lowest price. The mobile user device 102 may select the best result to purchase in terms of value by, for example, comparing different models of the same product or levels of service for a service. For example, if a tablet computing device has two versions with different amounts of storage at different prices, the mobile user device 102 may compare how much the tablet costs per unit of storage and thus maximizing the amount of product the consumer purchases per dollar. [IS THIS HOW VALUE IS DETERMINED? PLEASE ADVISE.]. Additionally, the mobile user device 102 may select the best result to purchase in terms of convenience by determining how far away the user is from the found products. The mobile user device 102 may use the results of the location module 208 to determine where the user is and where the found product is. The location that is the closest to the user may be selected as the most convenient. After the best results in terms of price, value, and convenience have been determined, the method 400 may continue to step 418.

At step 418, the mobile user device 102 may display the best results identified in step 416 to the user. After the best results have been displayed to the user, the method 400 may continue to step 420.

At step 420, the method 400 for searching for additional prices, discounts, and coupons and displaying the best results for a given product may end.

FIG. 5 illustrates a graphical user interface displayed on a mobile user device 102 in accordance with an embodiment of the present disclosure. For example, a consumer may visit XYZ mart to purchase gasoline. The mobile user device 102 hosting the mobile wallet system 112 may communicate with the POS terminal of XYZ mart to obtain transaction information. The mobile wallet system 112 may display information, for example, transaction information, geographical location information, aggregate account information, other information or the like, to the consumer via the mobile user device 102. The mobile wallet system 112 may determine a transaction device that maximizes rewards or incentives for the consumer based at least in part on geographical location information, aggregation account information, transaction information, and other information. The mobile wallet system 112 may provide a list of transaction devices, e.g., ABC card and DEF card, to the consumer. The consumer may select (e.g., clicking on the "OK") a trans-action device from the list of the transaction devices to complete the purchase of gasoline at XYZ mart.

Figure 6:
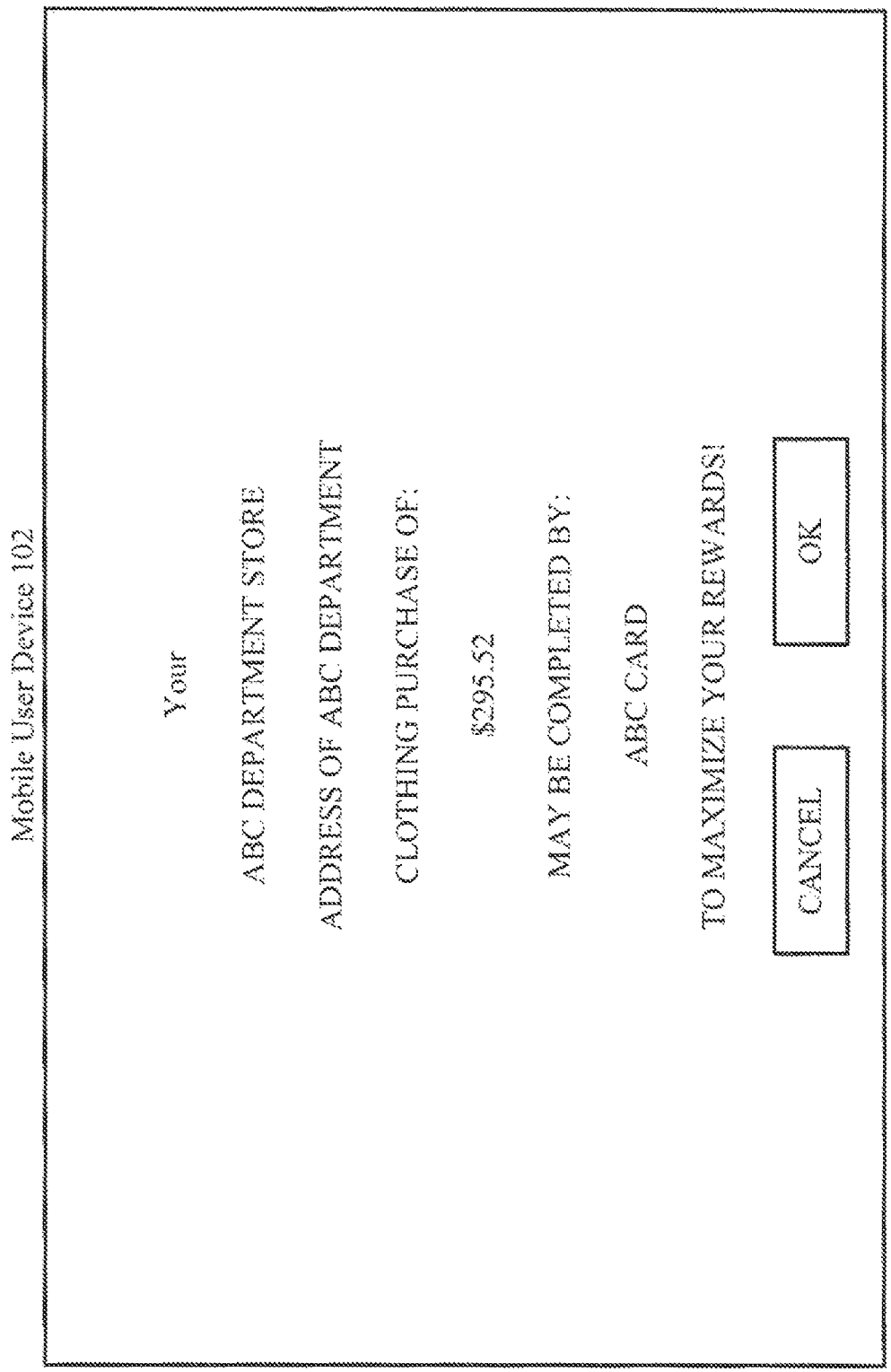
FIG. 6 is an illustration of a graphical user interface displayed on a mobile user device in accordance with another embodiment of the present disclosure.

FIG. 6 is an illustration of a graphical user interface displayed on a mobile user device in accordance with another embodiment of the present disclosure. For example, a consumer may visit ABC department store to purchase clothes. The mobile user device 102 hosting the mobile wallet system 112 may communicate with the POS terminal 110 of the ABC department store to obtain transaction information. The mobile wallet system 112 may display information, for example, transaction information, geographical location information, aggregate account information, other information or the like, to the consumer via the mobile user device 102. The mobile wallet system 112 may automatically determine a transaction device that maximizes rewards or incentives for the consumer based at least in part on geographical location information, aggregation account information, transaction information, and other information. The mobile wallet system 112 may provide the transaction device, e.g., ABC card, to the consumer. The consumer may confirm (e.g., clicking on the "OK") to use the transaction device to complete the purchase of clothes at the ABC department store.

For the purposes of this disclosure a computer readable medium stores computer data, which data can include computer program code that is executable by a processor of the SIM or mobile device, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

The present disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, and/or the like, and/or a combination of two or more thereof.

In an embodiment, the present disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Further in accordance with various aspects of the present disclosure, the methods described herein are intended for operation with dedicated hardware implementations including, but not limited to, microprocessors, PCs, PDAs, SIM cards, semiconductors, application specific integrated circuits (ASIC), programmable logic arrays, cloud computing devices, and other hardware devices constructed to implement the methods described herein.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A non-transitory computer readable storage media product comprising instructions for implementing a mobile wallet by a mobile phone, the non-transitory computer readable storage media product being configured to execute on a processor of the mobile phone to implement the mobile wallet, the instructions comprising:

instructions for the mobile phone to implement a processor, a memory, a location determination device, a graphical user interface, and a transceiver;

instructions for the processor of the mobile phone to implement an account module, the account module comprising a physical memory database configured to store account information in the memory of the mobile phone, the account information stored in the memory includes account information for a plurality of transaction devices issued to a consumer;

instructions for the mobile phone to implement a location module, the processor implementing the location module, the location module comprising the location determination device implemented by the processor of the mobile phone and configured to determine location information of the mobile phone that comprises at least a retail location;

instructions for the mobile phone to implement a reward program module, the processor implementing the reward program module, the reward program module comprising a physical memory database configured to store reward information of a plurality of reward programs in the memory of the mobile phone, the reward information being associated with the plurality of transaction devices;

instructions for the mobile phone to implement a point of sale module, the processor of the mobile phone implementing the point of sale module, the point of sale module configured to communicate with and receive transaction information with the transceiver from a communication component of a point-of-sale terminal, the transaction information comprising information to purchase products or services that comprises at least a price to purchase products or services;

instructions for the mobile phone to implement a payment method module, the processor of the mobile phone implementing the payment method module, the payment method module implemented by the processor being configured to determine a reward based on the transaction information and the reward information stored in the mobile phone for each transaction device of the plurality of transaction devices;

instructions for the processor to determine one or more of the plurality of transaction devices as recommendations to the consumer to complete a transaction in response to the account module, the payment method module, and the reward program module;

instructions for the processor to implement the graphical user interface to display on a display of the mobile phone the one or more of the plurality of transaction devices that comprise the recommendations to the consumer to complete the transaction that are displayed on the display of the mobile phone;

instructions for the processor to implement the graphical user interface on the display of the mobile phone to prompt the consumer for a selection of one or more of the plurality of transaction devices that comprise the recommendations to the consumer;

instructions for the processor to receive an input selection by the consumer of one of the one or more of the plurality of transaction devices that comprise the recommendations to the consumer to complete the transaction that are displayed on the display of the mobile phone through the graphical user interface on the display of the mobile phone to complete the transaction, the input selection by the consumer designating a consumer selected transaction device;

instructions for the mobile phone to implement a processing module, the processor of the mobile phone implementing the processing module, the processing module configured to use the consumer selected transaction device to complete a transaction to purchase the products or services by interacting with the point-of-sale terminal and establishing communication with the point-of-sale terminal to complete a purchase of products or services with the consumer selected transaction device;

instructions for the mobile phone to implement a summary report module, the processor of the mobile phone implementing the summary report module, the summary report module configured to generate a summary report listing rewards received by the consumer over a time period;

instructions for the mobile phone and the summary report module to generate, provide, and display the summary report to the consumer through the graphical user interface generated by the mobile phone on the display; and wherein the plurality of transaction devices comprise at least one of the following:
a credit card, debit card, pre-paid cards, a gift card, membership card, a stored-value card, a smart card, a refund card, a government card, a coupon, a reward, a voucher, an electronic mail, and a scan code.

2. The non-transitory computer readable storage media product comprising instructions for implementing a mobile wallet by a mobile phone of claim 1,
wherein the reward program module implemented by the processor is further configured to store reward information comprising rules and conditions of a reward; and
wherein the payment method module determines a transaction device based at least in part on credit limits or balance utilization of the transaction device.

3. The non-transitory computer readable storage media product comprising instructions for implementing a mobile wallet by a mobile phone of claim 1, wherein the payment method module determines a transaction device based at least in part on a user defined goal.

4. The non-transitory computer readable storage media product comprising instructions for implementing a mobile wallet implemented by a mobile phone of claim 1, further comprising:
instructions for the account module and the processor to receive updated account information with the transceiver of the mobile phone from at least one of the following: a transaction system and a financial institution,
wherein the updated account information comprises updated account information of the transaction devices; and
wherein the updated account information is stored in the account module.

5. The non-transitory computer readable storage media product comprising instructions for implementing a mobile wallet by a mobile phone of claim 4, wherein the payment method module implemented by the processor is further configured to select one of the transaction devices based on a ranking received from the consumer.

6. The non-transitory computer readable storage media product comprising instructions for implementing a mobile wallet implemented by a mobile phone of claim 1,
wherein the payment method module determines transaction information for the purchase of products or services; and
wherein the payment method module is configured to search for coupons, discounts, and retail prices associated with the products or services.

7. The non-transitory computer readable storage media product comprising instructions for implementing a mobile wallet implemented by a mobile phone of claim 1, further comprising:
instructions for a point of sale module to scan or photograph the product or service's identifying information or characteristics with a camera of the mobile phone;
instructions for the mobile phone implementing the point of sale module to store the identifying information or characteristics of a product or service in the mobile phone;
instructions for the mobile phone implementing the point of sale module to identify the identifying information or characteristics of a product or service in the mobile phone;
instructions for the mobile phone implementing the point of sale module to identify the rewards available associated with the plurality of transaction devices; and
instructions for the mobile phone implementing the point of sale module to select a best result available associated with one of the plurality of transaction devices.

8. The non-transitory computer readable storage media product comprising instructions for implementing a mobile wallet by a mobile phone of claim 1,
wherein the payment method module implemented by the processor is further configured to select one of the transaction devices based on a ranking received from the consumer; and
wherein the account information comprises at least one of the following:
identification number, expiration date, security number, name, address, phone number, electronic mail address, website address, income, spending habits and age of a consumer.

9. The non-transitory computer readable storage media product comprising instructions for implementing a mobile wallet by a mobile phone of claim 1, wherein the location determination device comprises at least one of the following: a global positioning system (GPS) device, a geomagnetic sensor, a local positioning system (LPS), a triangulation system, a trilateration system, a multilateration system, an indoor positioning system, a hybrid positioning system, a real-time locating system, and a dynamic positioning system.

10. A non-transitory computer readable storage media product comprising instructions for implementing a mobile wallet by a mobile phone, the non-transitory computer readable storage media product being configured to execute on a processor of the mobile phone to implement the mobile wallet, the instructions comprising:
instructions for the mobile phone to implement a processor, a memory, a location determination device, a graphical user interface, and a transceiver;
instructions for the processor of the mobile phone to implement an account module, the account module comprising a physical memory database configured to store account information in the memory of the mobile phone, the account information stored in the memory includes account information for a plurality of transaction devices issued to a consumer;
instructions for the mobile phone to implement a location module, the processor implementing the location module, the location module comprising the location determination device implemented by the processor of the mobile phone and configured to determine location information of the mobile phone that comprises at least a retail location;
instructions for the mobile phone to implement a reward program module, the processor implementing the reward program module, the reward program module comprising a physical memory database configured to store reward information of a plurality of reward programs in the memory of the mobile phone, the reward information being associated with the plurality of transaction devices;
instructions for the mobile phone to implement a point of sale module, the processor of the mobile phone implementing the point of sale module, the point of sale module configured to communicate with and receive transaction information with the transceiver from a communication component of a point-of-sale terminal, the transaction information comprising information to purchase products or services that comprises at least a price to purchase products or services;

instructions for the mobile phone to implement a payment method module, the processor of the mobile phone implementing the payment method module, the payment method module implemented by the processor being configured to determine a reward based on the transaction information and the reward information stored in the mobile phone for each transaction device of the plurality of transaction devices;

instructions for the processor to determine one or more of the plurality of transaction devices as recommendations to the consumer to complete a transaction in response to the account module, the payment method module, and the reward program module;

instructions for the processor to implement the graphical user interface to display on a display of the mobile phone the one or more of the plurality of transaction devices that comprise the recommendations to the consumer to complete the transaction that are displayed on the display of the mobile phone;

instructions for the processor to implement the graphical user interface on the display of the mobile phone to prompt the consumer for a selection of one or more of the plurality of transaction devices that comprise the recommendations to the consumer;

instructions for the processor to receive an input selection by the consumer of one of the one or more of the plurality of transaction devices that comprise the recommendations to the consumer to complete the transaction that are displayed on the display of the mobile phone through the graphical user interface on the display of the mobile phone to complete the transaction, the input selection by the consumer designating a consumer selected transaction device;

instructions for the mobile phone to implement a processing module, the processor of the mobile phone implementing the processing module, the processing module configured to use the consumer selected transaction device to complete a transaction to purchase the products or services by interacting with the point-of-sale terminal and establishing communication with the point-of-sale terminal to complete a purchase of products or services with the consumer selected transaction device; and instructions for the account module and the processor to receive updated account information with the transceiver of the mobile phone from at least one of the following: a transaction system and a financial institution, wherein the plurality of transaction devices comprise at least one of the following:

a credit card, debit card, pre-paid cards, a gift card, membership card, a stored-value card, a smart card, a refund card, a government card, a coupon, a reward, a voucher, an electronic mail, and a scan code.

11. The non-transitory computer readable storage media product comprising instructions for implementing a mobile wallet implemented by a mobile phone of claim 10, further comprising:

instructions for the mobile phone to implement a summary report module, the processor of the mobile phone implementing the summary report module, the summary report module configured to generate a summary report listing rewards received by the consumer over a time period.

12. The non-transitory computer readable storage media product comprising instructions for implementing a mobile wallet implemented by a mobile phone of claim 11, further comprising:

instructions for the mobile phone and the summary report module to generate, provide, and display the summary report to the consumer through the graphical user interface generated by the mobile phone on the display, wherein the updated account information comprises updated account information of the transaction devices; and wherein the updated account information is stored in the account module.

13. The non-transitory computer readable storage media product comprising instructions for implementing a mobile wallet implemented by a mobile phone of claim 10, further comprising:

instructions for a point of sale module to scan or photograph the product or service's identifying information or characteristics with a camera of the mobile phone;

instructions for the mobile phone implementing the point of sale module to store the identifying information or characteristics of a product or service in the mobile phone; and instructions for the mobile phone implementing the point of sale module to identify the identifying information or characteristics of a product or service in the mobile phone.

14. The non-transitory computer readable storage media product comprising instructions for implementing a mobile wallet implemented by a mobile phone of claim 10, further comprising:

instructions for the mobile phone implementing the point of sale module to identify the rewards available associated with the plurality of transaction devices; and instructions for the mobile phone implementing the point of sale module to select a best result available associated with one of the plurality of transaction devices.

15. The non-transitory computer readable storage media product comprising instructions for implementing a mobile wallet by a mobile phone of claim 10, wherein the location determination device comprises at least one of the following: a global positioning system (GPS) device, a geomagnetic sensor, a local positioning system (LPS), a triangulation system, a trilateration system, a multilateration system, an indoor positioning system, a hybrid positioning system, a real-time locating system, and a dynamic positioning system.

16. The non-transitory computer readable storage media product comprising instructions for implementing a mobile wallet by a mobile phone of claim 10, wherein the reward program module implemented by the processor is further configured to store reward information comprising rules and conditions of a reward;

wherein the payment method module determines transaction information for the purchase of products or services; and wherein the payment method module determines a transaction device based at least in part on credit limits or balance utilization of the transaction device.

17. The non-transitory computer readable storage media product comprising instructions for implementing a mobile wallet by a mobile phone of claim 10, wherein the payment method module determines transaction information for the purchase of products or services; and wherein the payment method module determines a transaction device based at least in part on a user defined goal.

18. The non-transitory computer readable storage media product comprising instructions for implementing a mobile wallet by a mobile phone of claim 10,
wherein the payment method module implemented by the processor is further configured to select one of the transaction devices based on a ranking received from the consumer; and
wherein the account information comprises at least one of the following:
identification number, expiration date, security number, name, address, phone number, electronic mail address, website address, income, spending habits and age of a consumer.

19. The non-transitory computer readable storage media product comprising instructions for implementing a mobile wallet implemented by a mobile phone of claim 10,
wherein the payment method module determines transaction information for the purchase of products or services; and
wherein the payment method module is configured to search for coupons, discounts, and retail prices associated with the products or services.

* * * * *